E. DISH.
METER HOLDER AND CONNECTION.
APPLICATION FILED APR. 13, 1916.

1,201,568.  Patented Oct. 17, 1916.

INVENTOR
Edward Dish
BY
George J. Oltsch
ATTORNEY

UNITED STATES PATENT OFFICE.

EDWARD DISH, OF SOUTH BEND, INDIANA.

METER HOLDER AND CONNECTION.

1,201,568.

Specification of Letters Patent.    Patented Oct. 17, 1916.

Application filed April 13, 1916. Serial No. 90,876.

*To all whom it may concern:*

Be it known that I, EDWARD DISH, a citizen of the United States, residing at South Bend, in the county of St. Joseph and State of Indiana, have invented certain new and useful Improvements in Meter Holders and Connections, of which the following is a specification.

My invention relates to a combined holder and connection for water meters, gas meters and the like, and the primary object thereof resides in the provision of means for mounting and supporting the meter which will at the same time serve to establish communication between the service or supply pipe and the meter, thus making for simplicity of structure and cheapness of manufacture.

A further object resides in the provision of a water meter connection whereby the meter is supported in an upright or vertical position, when installed on a vertically disposed supply pipe, thereby presenting the face of the meter uppermost and in the most convenient position for reading the meter.

A further object resides in the provision of a holder or mounting for the support of the meter through which communication is established between the supply or service pipe and the meter, and between which connection can be made or broken in an expeditious manner and without the use of any threaded couplings or connections, thus effecting a considerable saving of both time and labor over the present method of installing water meters by direct screw-threaded connections.

The invention in the preferred form of details will be described in the following specification, reference being had particularly to the accompanying drawings, in which:—

Figure 1:
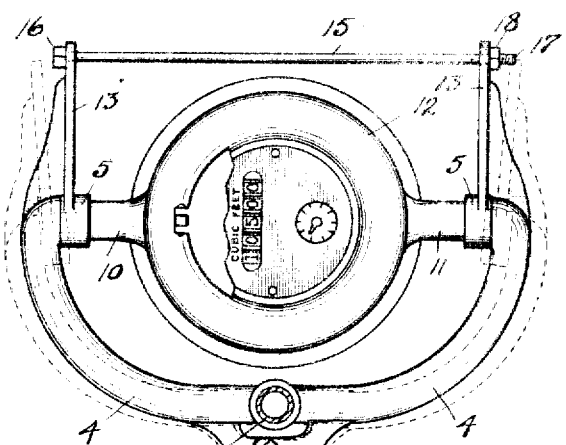
Figure 3:
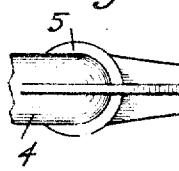
Figure 4:
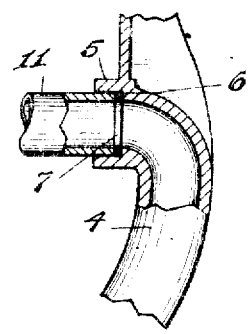
Figure 2:
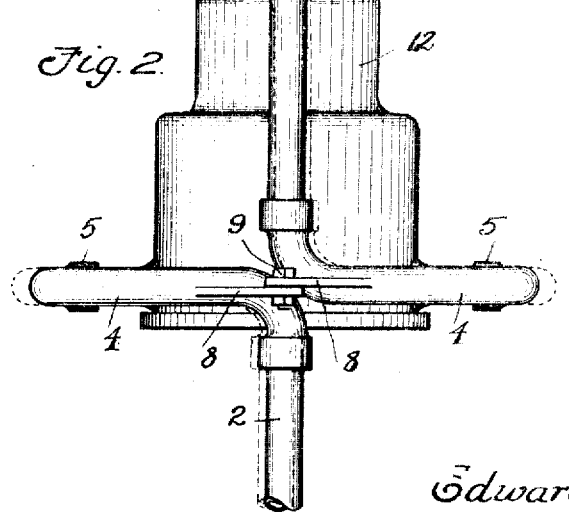

Figure 1 is a plan or top view showing the application of the invention. Fig. 2 is an elevation thereof. Fig. 3 is an enlarged detail broken side view of the free end of one of the connector arms. Fig. 4 is a fragmentary detail view partly in section showing one of the joints forming a connection between the meter and connector arms.

In the drawings 1 indicates a service or supply pipe, which, for the purpose of applying my invention, is divided into two sections 2 and 3, the water entering through the section 2, flowing through the meter and to the outlet point through section 3. Connected to the proximate terminals of the sections 2 and 3, and in inverse relation, are what I term connector arms 4, consisting of tubular castings arcuate in form, and provided with opposing inwardly directed coupling heads 5, inwardly shouldered as at 6 to form a back-stop for a rubber or other suitable washer 7. Integrally formed with the connector arms 4 and extending toward each other in overlapping relation are hinge arms 8—8, connected by a pivot bolt 9, whereby the free ends of the connector arms may be relatively swung on said pivot and separated a sufficient distance between the coupling heads 5 thereof to permit the oppositely disposed inlet and outlet pipes 10 and 11 of the meter 12 to be received by said coupling heads, and communication established between the sections 2 and 3 of the supply or service pipe through the meter. It is to be understood, of course, that in order to permit the connector arms 4 to be swung on their common pivot, the pipe sections 2 and 3 must be sufficiently flexible and free at their proximate ends so that same may be flexed or sprung in a slight degree, as illustrated by dotted lines in Fig. 2.

Extending forwardly of the connector arms 4 are bracket members 13, each provided with a hole 14 adjacent the outer ends thereof to receive a rod 15, having a fixed head 16 at one end, and screw-threaded at the opposite end 17 to receive a nut 18. It will be obvious from the foregoing description read in connection with the drawings, that by the simple manipulation of the nut 18, the connector arms may be drawn together in a manner that will cause the ends of the meter inlet and outlet pipes 10 and 11 to be so tightly engaged by the washers in the coupling heads 5 that a water tight joint will be effected, and that by simply removing the nut and slightly spreading the connector arms, the meter may be quickly and easily removed or replaced, without requiring any pipes to be unthreaded or threaded joints disturbed, as is necessary under the present practice.

While the foregoing is the preferred form of my invention, I desire it to be understood that I do not limit myself to the precise structure shown and described, as it is obvious that the same may be variously modified without departing from the spirit of the invention.

What I claim is:—

1. A meter support and connection comprising conduit arms hingedly joined at one end and adapted for connection at their hinged ends with service pipe sections, the opposite ends of the arms being free for relative adjustment, and means for connecting the free ends with the connections of a meter.

2. A meter support and connection comprising opposing adjustable conduit arms, one end of which are adapted to have connection in relative close proximity with substantially alined service pipe sections, said arms extending laterally of the pipe sections and having inwardly directed free ends, and means for connecting the free ends with the connections of a meter, whereby said arms serve both as a support for the meter and as a means for establishing communication between the pipe sections through the meter.

3. A meter support and connection comprising opposing adjustable conduit arms adapted for connection with laterally yielding service pipe sections, the arms having inwardly and opposingly disposed coupling heads forming the terminus of their conduits, said heads being adapted for engagement with the oppositely disposed connections of a meter, and means for drawing the arms in the direction of each other to effect such engagement.

4. A meter support and connection comprising opposing adjustable conduit arms adapted for connection with independent service pipe sections, means for establishing connections between said arms and a meter, and means connecting said arms whereby to draw same in the direction of each other to engage the meter connections.

5. A meter support and connection comprising laterally yielding service pipe sections, conduit arms extending laterally of and having connection at one end with said pipe sections; said arms being relatively adjustable and having inwardly directed conduit terminals adapted for engagement with the connections of a meter, and means connecting the free ends of said arms whereby to draw the same in the direction of each other to engage the meter connections.

6. A meter support and connection comprising laterally yielding service pipes, hingedly joined conduit arms having connection at one end with said pipe sections, and their opposite ends free for relative adjustment, a meter having oppositely disposed connections, and means for drawing the free ends of said arms in the direction of each other to establish communication between said arms and the meter connections.

7. A meter support and connection comprising hingedly connected conduit arms, the hinged ends of which comprise oppositely directed angularly disposed terminals adapted for connection with service pipe sections, the opposite ends of the arms being free for relative adjustment and having inwardly directed and opposing conduit openings, and adjusting means connecting the free ends of the arms whereby the same may be drawn together to effect a connection between the conduit openings of the arms and the connections of a meter.

In testimony whereof I affix my signature in presence of two witnesses.

EDWARD DISH.

Witnesses:
 AGNES GORDON,
 GEORGE J. OLTSCH.